No. 812,989. PATENTED FEB. 20, 1906.
C. B. GOODE.
POWER BRAKE MECHANISM.
APPLICATION FILED JAN. 4, 1905. RENEWED NOV. 11, 1905.

2 SHEETS—SHEET 1

Witnesses
Inventor:
Curtis B. Goode

No. 812,989. PATENTED FEB. 20, 1906.
C. B. GOODE.
POWER BRAKE MECHANISM.
APPLICATION FILED JAN. 4, 1905. RENEWED NOV. 11, 1905.

2 SHEETS—SHEET 2.

Witnesses
C. H. Gannett
J. Murphy

Inventor:
Curtis B. Goode
by Jas. H. Churchill
Atty.

UNITED STATES PATENT OFFICE

CURTIS BATES GOODE, OF BOSTON, MASSACHUSETTS.

POWER-BRAKE MECHANISM.

No. 812,989.        Specification of Letters Patent.        Patented Feb. 20, 1906.

Application filed January 4, 1905. Renewed November 11, 1905. Serial No. 286,836.

*To all whom it may concern:*

Be it known that I, CURTIS BATES GOODE, a citizen of the United States, residing in Boston, in the county of Suffolk and State of Massachusetts, have invented an Improvement in Power-Brake Mechanism, of which the following description, in connection with the accompanying drawings, is a specification, like characters on the drawings representing like parts.

This invention relates to a fluid-brake for vehicles, which is especially designed and adapted for use on automobiles.

The invention has for its object to provide a simple, efficient, and comparatively inexpensive power-brake for use on automobiles and like vehicles. For this purpose I employ a compressor, such as an air-pump, which may be connected directly or indirectly with a shaft or axle of the vehicle, such as the rear axle of an automobile, and provide means for controlling the accumulation of pressure and connect said compressor with a reservoir into which said compressor discharges and provide means for controlling communication between said compressor and reservoir, which is operated from the shaft or axle so as to admit compressed fluid from the reservoir into the compressor to obtain an initial rise in pressure in said compressor, whereby a power-brake of maximum efficiency may be obtained.

Provision is made for stopping the vehicle gradually or substantially in an instant, as will be described.

These and other features of this invention will be pointed out in the claims at the end of this specification.

Figure 1:
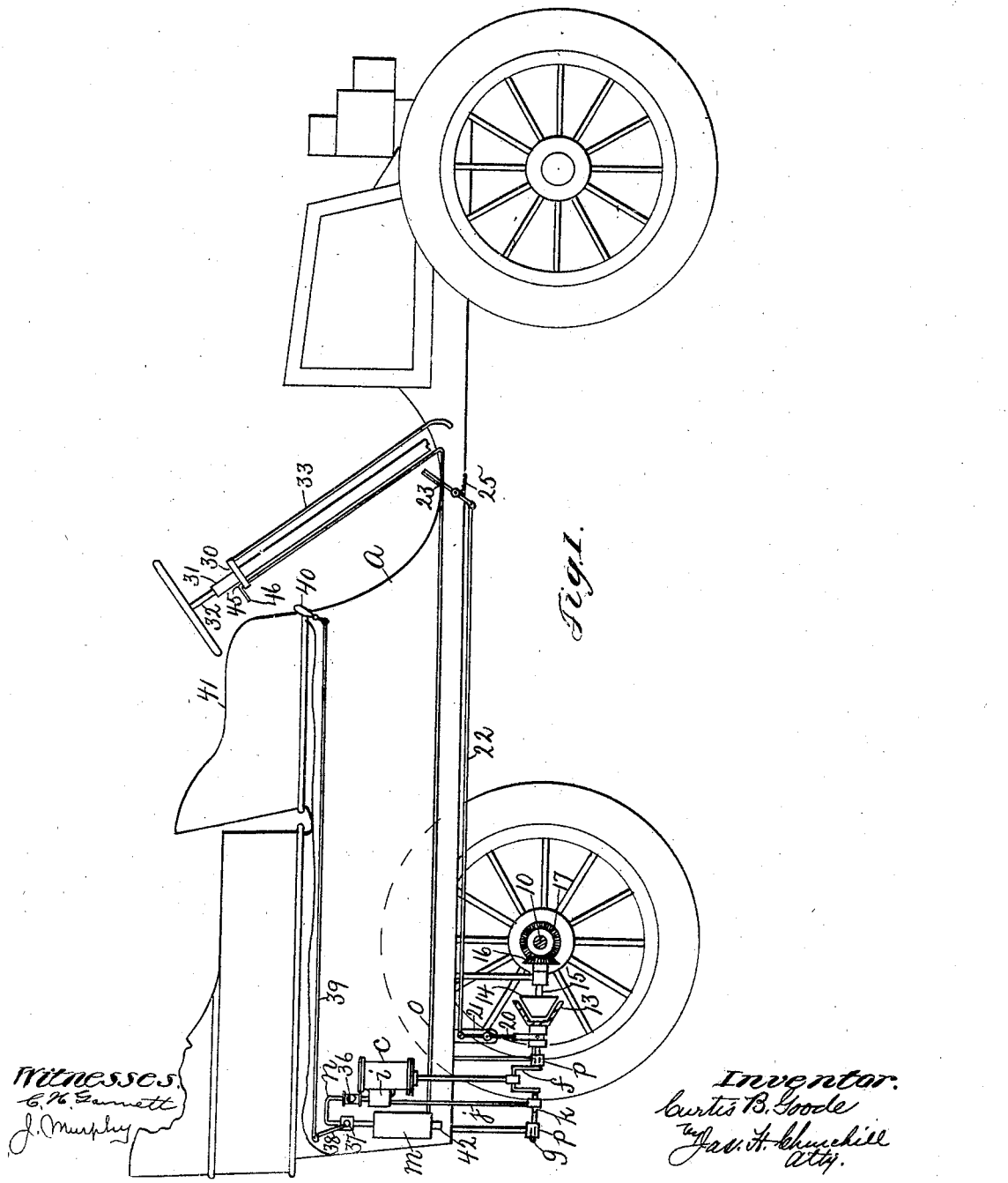
Figure 2:
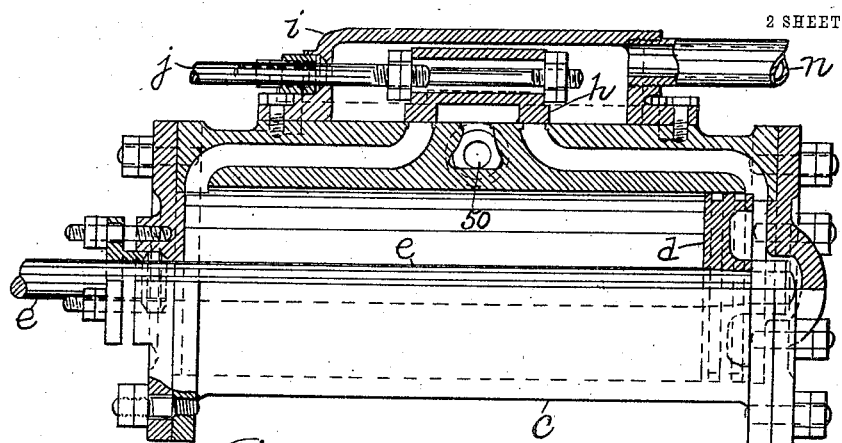
Figure 3:
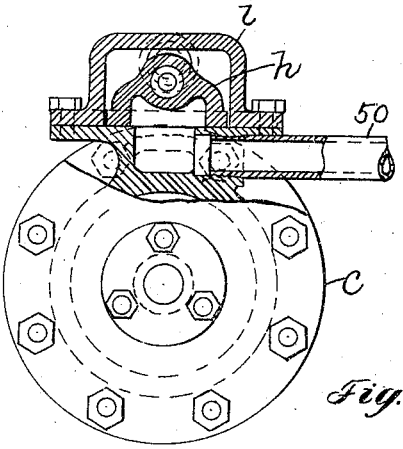

Figure 1 is a side elevation of one form of automobile provided with a fluid-brake embodying this invention; Fig. 2, a detail in longitudinal section of the cylinder and valve shown in Fig. 1; Fig. 3, a detail in end elevation and cross-section of the cylinder and valve shown in Fig. 1; and Fig. 4, a diagram to be referred to.

Referring to the drawings, $a$ represents an automobile vehicle of any suitable or usual construction, which is provided with a fluid-brake embodying this invention. In the present instance the power-brake comprises a compressor consisting of a cylinder $c$, a piston $d$, having its piston-rod $e$ connected to a crank $f$ on a shaft $g$, a slide-valve $h$, located within a valve-chest $i$ and having its valve-rod $j$ connected with a crank $k$ on the shaft $g$, which crank $k$ is set at about ninety degrees to the crank $f$, and a reservoir $m$, which is connected by the pipe $n$ with the outlet-port of the valve-chest $i$ and is provided with an exhaust-pipe $o$. The crank-shaft $g$ is supported in suitable bearings $p$, hung from the vehicle $a$, and is adapted to be connected with the rear axle 10 of the said vehicle, which connection may and preferably will be effected as will be described. For this purpose the crank-shaft $g$ has keyed to it to rotate therewith and slide thereon a friction-clutch member 13, which coöperates with a clutch member 14, fast on a shaft 15, provided with a bevel-gear 16, which meshes with a bevel-gear 17 on the axle 10.

The friction member 13 is adapted to be engaged with and disengaged from the member 14 by a lever 20, pivoted to a hanger or bracket 21 and connected by a link 22 with a lever 23, adapted to be moved in one direction to couple the friction member 13 with the member 14 by the foot of the operator and to be moved in the opposite direction by a spring 25, connected with the lever 23.

The exhaust-pipe $o$ from the compressor $m$ may be connected with the inlet-port of a valve-casing 30, attached to the bearing-tube 31 for the steering-shaft 32 and having its outlet-port communicating with an exhaust-pipe 33, which leads below the bottom of the vehicle-body and discharges into the atmosphere or it may be into the usual muffler. (Not shown.) The pipe $n$, connecting the reservoir with the valve-chest $i$, may be provided with a prop or check valve 36 of any suitable construction and also with a hand-operated valve 37, which is provided with a crank or handle 38, connected by a link 39 with a hand-lever 40, located near the driver's seat 41.

The reservoir $m$, if desired, may also be provided with a safety-valve 42 of any suitable construction. The valve-casing 30 is provided with a valve 45, which is provided with a handle 46, by means of which the exhaust from the reservoir to the atmosphere may be closed or opened to any desired extent.

In practice the exhaust-valve 45 may be normally wide open and the friction-clutch uncoupled. When it is desired to stop the vehicle by the power-brake, the operator presses his foot upon the lever 23 and moves the friction-clutch member 13 into engagement with the friction member 14 and wholly or partially closes the exhaust-valve 45. As soon as the friction-clutch is operated the crank-shaft $g$ is connected with the driving-shaft or axle 10 and is rotated therefrom.

The rotation of the crank-shaft $g$ effects reciprocation of the piston $d$ and valve $h$, and air is drawn into the compressor through the inlet-pipe 50 and is forced out therefrom under pressure through the pipe $n$ into the reservoir $m$, the valve 37 being in its opened position and the check or pop valve 36 being automatically opened by the pressure of air and automatically closed in the usual manner to shut off the escape of pressure from the reservoir back into the valve-chest. As long as the exhaust-valve 45 is closed the air is accumulated under pressure in the reservoir $m$ and offers a resistance to the movement of the piston $d$, thereby placing a brake or drag on the rotation of the crank-shaft $g$ and its driving-shaft—namely, the axle 10—which resistance increases until the rotation of the axle or shaft 10 is arrested. The application of the resistance due to the accumulated pressure may be regulated or controlled by opening the exhaust-valve 45 more or less.

When the exhaust-valve 45 is wide open, the compressor may be driven by the rear axle without any braking effect on the vehicle, and under these circumstances the crank-shaft $g$ may be connected with the rear axle while the vehicle is in motion, if so desired. If it is desired to stop the vehicle, the exhaust-valve 45 may be closed gradually, with the result that the air-pressure gradually increases in the reservoir and offers an accumulated resistance to the rotation of the crank-shaft $g$ and to the rear axle or driving-shaft, thereby gradually diminishing the speed of the vehicle.

The resistance of the accumulated pressure reaches the maximum soon after the exhaust-valve is closed, and this maximum resistance is sufficient to bring the vehicle to a dead stop. If it is desired to apply the brake very gradually, the clutch member 13 may be gradually brought into engagement with the clutch member 14 by operating the foot-lever 23, and simultaneously the exhaust-valve may be gradually closed. If it is desired to bring the vehicle to a quick or sudden stop, the lever 40 is operated to close the passage in the pipe $n$ and the exhaust-valve is closed, thereby bringing the air-pressure to the maximum substantially in an instant and effecting the stopping of the vehicle substantially in an instant. The closing of the valve 37 disconnects the reservoir $m$ from the compressor, and while I may prefer to use the reservoir $m$ it might be dispensed with, in which case the pipe $n$ and valve-chest $i$ would serve as a reservoir of smaller capacity and would communicate with the atmosphere and the valve 37 would become the exhaust-valve, by manipulating which the stopping of the vehicle could be controlled.

Figure 4:
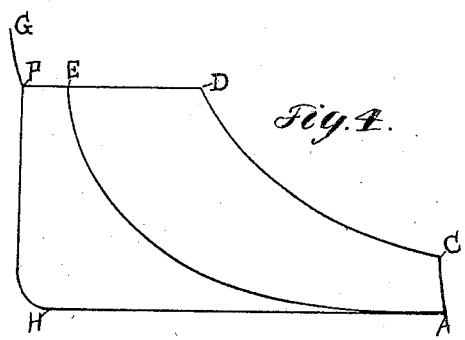

In Fig. 4 I have represented a diagram illustrating the rise in pressure when the apparatus is employed on a heavy vehicle. In Fig. 4 two cycles are represented. One, which may be termed the "starting" cycle, is represented by the letters A E F G F H A, and the other, termed the "full-working" cycle, is represented by the letters A C D F G F H A. In the working cycle the curve A C is due to the rise in pressure when the valve $h$ opens and is caused by the pressure of air in the valve-chest and piping, which should, when the volume of the valve-chest and piping up to the pop-valve 36 is forty cubic inches, raise the pressure in the cylinder $c$ about fifty pounds, and by means of this initial rise in pressure a materially greater pressure may be obtained in the compressor, which particularly adapts the brake for heavy vehicles, the greater pressure thus obtained being represented in Fig. 4 by the lines C D E.

The invention is herein shown as applied to an automobile; but it is not desired to limit the invention in this respect, as it may be applied to railway-cars and other vehicles. So, also, the brake may be employed in connection with any revoluble shaft.

I claim—

1. The combination with a vehicle provided with a rotatable shaft, of an air-compressor carried by said vehicle and provided with an air-inlet port and with an exhaust-port independent of said air-inlet port, a piston in said compressor, a reservoir communicating with said exhaust-port, a valve controlling said air inlet and exhaust ports, mechanism for operating said piston from said shaft, mechanism for operating said valve from said shaft to admit compressed air from said reservoir into said compressor to obtain an initial rise in pressure within said compressor, which is increased by the movement of said piston in said compressor, and a valve to control the exhaust from said reservoir, for the purpose specified.

2. The combination with a vehicle, of a fluid-compressor carried thereby and driven from a moving member or part of said vehicle, a reservoir communicating with said compressor, a valve controlling communication between said reservoir and said compressor and operated from said driven member or part of said vehicle, to admit compressed fluid from said reservoir into said compressor to obtain an initial rise in pressure within said compressor, and means to control the exhaust of compressed fluid from said reservoir, substantially as described.

3. The combination with a movable member, of a fluid-compressor driven from said movable member, a reservoir communicating with said compressor, a valve controlling communication between said reservoir and said compressor and operated from said movable member to admit compressed fluid from said reservoir into said compressor to obtain an initial rise in pressure within said compressor, and means to control the exhaust of compressed fluid from said reservoir, substantially as described.

In testimony whereof I have signed my name to this specification in the presence of two subscribing witnesses.

CURTIS BATES GOODE.

Witnesses:
JAS. H. CHURCHILL,
J. MURPHY.